United States Patent [19]
Terrell

[11] 3,896,178
[45] July 22, 1975

[54] INHALANT ANESTHETIC COMPOSITIONS AND METHOD

[75] Inventor: Ross C. Terrell, Plainfield, N.J.

[73] Assignee: Airco, Inc., Montvale, N.J.

[22] Filed: July 18, 1973

[21] Appl. No.: 380,419

Related U.S. Application Data

[62] Division of Ser. No. 159,512, July 2, 1971, Pat. No. 3,769,433.

[52] U.S. Cl. ............................................. 260/614 F
[51] Int. Cl. ........................ C07c 43/00; C07c 43/12
[58] Field of Search ................................. 260/614 F

[56] References Cited
UNITED STATES PATENTS
3,637,477   1/1972   Croix ............................... 260/614 F OTHER PUBLICATIONS
Terrell et al., J. Med. Chem., (1971), 14, No. 6, 517–519.

Larsen, Fluorine Chemistry Reviews, Vol. 3, (1969), 38–39.

*Primary Examiner*—Howard T. Mars
*Attorney, Agent, or Firm*—Roger M. Rathbun, Esq.; Edmund W. Bopp; H. Hume Matthews, Esq.

[57] ABSTRACT

The novel compounds 2,2-difluoroethyl difluoromethyl ether and its 1-chloro derivative having the formula $CHF_2CHCl-O-CHF_2$ are disclosed. The latter compound can be prepared through chlorination of 2,2-difluoroethyl difluoromethyl ether which in turn can be made by reaction of 2,2-difluoroethanol and difluorochloromethane in the presence of aqueous sodium hydroxide. The novel compounds are useful as inhalation anesthetics and as solvents and dispersants for fluorinated materials.

3 Claims, No Drawings

INHALANT ANESTHETIC COMPOSITIONS AND METHOD

This is a division of application Ser. No. 159,512, filed July 2, 1971, now Pat. No. 3,769,433.

This invention relates to the compounds 2,2-difluoroethyl difluoromethyl ether and 1-chloro-2,2-difluoroethyl difluoromethyl ether, and their use in producing anesthesia in anesthetic-susceptible, air-breathing mammals. The compounds have the formula $CHF_2CHY-O-CHF_2$ wherein Y is hydrogen or chlorine.

The compound 2,2-difluoroethyl difluoromethyl ether has the following formula:

$$CHF_2CH_2-O-CHF_2$$

This ether is normally a clear, colorless liquid with an ethereal odor, and has the following physical properties: boiling point 55°C.; vapor pressure 225 mm. at 25°C.; specific gravity 1.34; refractive index $N_D^{20}$ 1.2966 and molecular weight 132.

The compound 1-chloro-2,2-difluoroethyl difluoromethyl ether has the following formula:

$$CHF_2CHCl-O-CHF_2$$

This ether is normally a clear, colorless liquid with an ethereal odor, and has the following physical properties: boiling point 74°C.; vapor pressure 125 mm. at 25°C.; specific gravity 1.5; refractive index $N_D^{20}$ 1.3351 and molecular weight 166.5.

The above-described compounds, 2,2-difluoroethyl difluoromethyl ether and its 1-chloro derivative, are soda lime stable and anesthetics for anesthetic-susceptible mammals. These ethers are also easily miscible with other organic liquids including fats and oils and have useful solvent properties, for example, as a solvent for fluorinated olefins and other fluorinated materials such as fluoro waxes. The compounds may be used to prepare pastes and dispersions of such materials useful for coatings and the like, and may be used as degreasing agents.

The compound 2,2-difluoroethyl difluoromethyl ether can be made by reacting 2,2-difluoroethanol with difluorochloromethane in the presence of aqueous sodium hydroxide which neutralizes the hydrogen chloride formed by the reaction. At the completion of the reaction the desired ether product can be separated from the reaction mixture by fractional distillation.

The compound 1-chloro-2,2-difluoroethyl difluoromethyl ether can be prepared by chlorinating 2,2-difluoroethyl difluoromethyl ether. The chlorination can be carried out in either a fully or partially transparent vessel so that photo energy can be supplied to the reaction. Suitable sources of photo energy are incandescent, ultraviolet and fluoroescent lamps and even strong sun light. In view of the ready availability, low cost and ease of handling of incandescent lamps, they are preferred for use as the illumination source.

The chlorination reaction can be carried out by bubbling gaseous chlorine into liquid $CHF_2CH_2-O-CHF_2$ while it is strongly illuminated. The chlorine is added at the same rate at which it reacts which can be determined by checking for chlorine vapor in the effluent from the chlorinator. The reaction is exothermic so cooling water should be supplied to the chlorination apparatus to control the reaction. The chlorination can be carried out at any temperature from 15°C. up to the boiling point of the chlorination mixture. Best results are usually found at 25°–35°C. where the reaction rate is fast enough and the formation of by-products does not present a serious problem.

The effluent from the chlorination apparatus can be passed through a water scrubber to dissolve the HCl which is formed. The chlorination should be continued until 0.8 to 1 mole of HCl per mole of starting ether is detected by titration of the dissolved HCl with a standard base. The extent of the chlorination can be controlled by the amount of chlorine bubbled through the ether and determined by the amount of effluent HCl. If too little HCl is evolved it indicates that the chlorination is slow. If too much HCl is determined it indicates that polychloro products have been formed or that the ether has decomposed into undesirable chlorinated reaction products.

Following the chlorination the reaction mass can be separated by fractional distillation or by vapor phase chromatography. If distillation is employed it is recommended that the pressure be reduced in view of the high molecular weight of the product $CHF_2CHCl-O-CHF_2$. Excessive heating should be avoided in view of the possibility of decomposition of the desired product.

The following examples will illustrate the preparation of the novel ethers of this invention.

EXAMPLE I

SYNTHESIS OF $CHF_2CH_2OCHF_2$

50% Aqueous sodium hydroxide solution (284 g.) was added slowly to a mixture of $CHF_2CH_2OH$ (82 g.) and $CHF_2Cl$ (Freon 22) (86 g.) in a 500 cc. stirred autoclave while holding the temperature at 25°–60° and the pressure at 50–150 psi. At the end of the reaction, the product 2,2-difluoroethyl difluoromethyl ether was isolated by fractional distillation to give 60 g., b.p. 55°, $N_D^{20}$ 1.2966. The product was flammable and analyzed as follows:

Calc. for $C_3H_4F_4O$: C, 27.3 : H, 3.0
Found: C, 27.2 : H, 2.6

EXAMPLE II

SYNTHESIS OF $CHF_2CHClOCHF_2$ 43.2 Grams of $CHF_2CH_2-O-CHF_2$ were added to a waterjacketed chlorinator fitted with a thermometer, a "Dry-Ice" cold finger type condenser and a fritted glass gas dispersion tube. The reaction was carried out at 25°C. with gaseous chlorine being bubbled through the solution which was exposed to a source of illumination. The effluent HCl was collected in a scrubber and aliquots were titrated with a standard base. The reaction was continued until 1 mole of HCl per mole of ether was titrated. The product $CHF_2CHCl-O-CHF_2$ was recovered by distillation and preparative gas chromatography, bp. 74°C., $N_D^{20}$ 1.3351. This product had borderline flammability.

Calculated Formulation $C_3H_3ClF_4O$: C, 21.61; H, 1.81; F, 45.56
Found C, 21.73; H, 1.87; F, 45.45

The structure $CHF_2CHCl-O-CHF_2$ was confirmed by determination of the nuclear magnetic resonance spectrum.

In order to determine the potency of 2,2-difluoroethyl difluoromethyl ether and 1-chloro-2,2-difluoroethyl difluoromethyl ether as inhalation anesthetics in respirable mixtures containing life-supporting amounts of oxygen, several tests were carried out employing mice. The compounds tested were at least 99.5% pure as determined by vapor phase chromatography.

The compound 2,2-difluoroethyl difluoromethyl ether, for example, was administered to test mice by a standard procedure in which a measured quantity of the agent is placed in a laboratory jar and allowed to completely evaporate so as to calculated vapor concentration. The test mice are then quickly placed in the jar and observed. Anesthesia is determined by observing the righting reflex of the mice. In such tests the 2,2-difluoroethyl difluoromethyl ether induced anesthesia of the mice in approximately 10 minutes at 5% vapor concentration. Some slight irritation in the test animals was possibly noticed. Recovery was observed to take place in one minute, illustrating the value of the test compound as a mild anesthetic, useful, for example, where a relatively greater amount of control over the patient is desired. Recovery time is measured beginning when the test mice are transferred from the test jar to room air and ending when the mice are observed to be able to walk. There were no delayed deaths.

A similar test was conducted with 1-chloro-2,2-difluoroethyl difluoromethyl ether. With 1% concentration of this agent, induction occurred at 1 minute and 17 seconds and recovery at 1 minute and 33 seconds. At 1.5% concentration, induction took 41 seconds and recovery took 4 minutes and 48 seconds. At 2.5% concentration, induction time was down to only 12 seconds, while recovery required more than 10 minutes. The agent produced some irregular muscle movements at the highest concentration and occasional movements throughout the test period when using the lowest concentration. There were no delayed deaths.

The compound 1-chloro-2,2-difluoroethyl difluoromethyl ether is a potent anesthesia agent which is rapidly taken up and excreted by warm-blooded mammals. The compound also has analgesic properties. The recovered animals appeared fully alert. In comparison with the 1-chloro-2,2,2-trifluorethyl difluoromethyl ether anesthetic agent of my U.S. Pat. No. 3,535,425, 1-chloro-2,2-difluoroethyl difluoromethyl ether gives less induction times at comparable concentrations. Thus with mice, 2.5% of the agent of my prior patent gave an induction time of 30 seconds while 2.5% of this anesthesia of this invention showed an induction time of only 12 seconds.

The anesthetic agents of the invention may be administered by any of the well known techniques used for the administration of general inhalation agents, such as the open drop, semiclosed, and closed systems. The agents may also be administered as an injectable anesthetic as taught by John C. Krantz, Jr., in U.S. Pat. No. 3,216,897, issued Nov. 9, 1965 and assigned to the assignee of the instant application.

The compounds of this invention lend themselves to effective use as inhalent anesthetics in respirable mixtures containing life-supporting concentrations of oxygen as well as mixtures containing oxygen and other inhalation anesthetics such as nitrous oxide. The effective amount of the ethers of this invention to be employed depends on the level of anesthesia to which the mammal is to be brought, the rate at which anesthesia is to be induced, and the length of time over which anesthesia is to be maintained. Minor volume percentages of the ethers in oxygen from a fraction of a percent of the ethers, for instance, at least about 0.5%, up to several percent, e.g. up to about 8%, can be employed. The amount of anesthesia to be used can be easily regulated, starting with a small amount of the ether and gradually increasing the amount until the desired plane of anesthesia is reached. By then monitoring the physical reactions of the mammal, as is the usual procedure, the duration and plane of anesthesia can be readily controlled.

While there has been described what are at present considered to be the preferred embodiments of the invention, it will be understood that various modifications may be made therein which are within the true spirit and scope of the invention.

I claim:

1. The compounds of the formula:

$$CHF_2CHX-O-CHF_2$$

wherein X is hydrogen or chlorine.

2. The compound 1-chloro-2,2-difluoroethyl difluoromethyl ether of the formula $CHF_2CHCl-O-CHF_2$.

3. The compound 2,2-difluoroethyl difluoromethyl ether of the formula $CHF_2CH_2-O-CHF_2$.

* * * * *